United States Patent
Chen

(10) Patent No.: US 6,983,837 B1
(45) Date of Patent: Jan. 10, 2006

(54) FINISHED PRODUCT RECEIVING UNIT USED IN A CORRUGATED METAL SHEET MEMBER MAKING MACHINE

(76) Inventor: Chun-Liang Chen, 2F., No. 20-1, Ting-Tien-Liao, Tamshui Town, Taipei Hsien (TW)

( * ) Notice: Subject to any disclaimer, the term of this patent is extended or adjusted under 35 U.S.C. 154(b) by 0 days.

(21) Appl. No.: 10/902,026

(22) Filed: Jul. 30, 2004

(51) Int. Cl.
*B65G 29/00* (2006.01)

(52) U.S. Cl. ............... 198/466.1; 198/607; 198/468.9; 198/468.11

(58) Field of Classification Search ............... 198/817, 198/604, 605, 607, 466.1, 468.6, 469.9, 468.11
See application file for complete search history.

(56) References Cited

U.S. PATENT DOCUMENTS

| | | | | |
|---|---|---|---|---|
| 4,573,862 A | * | 3/1986 | Anderson | 198/750.11 |
| 4,639,180 A | * | 1/1987 | Cucchi et al. | 414/224.01 |
| 5,368,643 A | * | 11/1994 | Kuster | 118/324 |
| 5,638,665 A | * | 6/1997 | Muller | 53/543 |
| 5,711,412 A | * | 1/1998 | Gysin et al. | 198/732 |
| 6,082,526 A | * | 7/2000 | Baker et al. | 198/817 |
| 6,220,424 B1 | * | 4/2001 | Fluck | 198/468.6 |
| 6,253,907 B1 | * | 7/2001 | Lachmann et al. | 198/750.14 |
| 6,378,198 B1 | * | 4/2002 | Asai et al. | 29/825 |

\* cited by examiner

*Primary Examiner*—Joe Dillon, Jr.
(74) *Attorney, Agent, or Firm*—Troxell Law Office, PLLC

(57) ABSTRACT

A finished product receiving unit used in a corrugated metal sheet member making machine for receiving finished products is disclosed to include a rack, two pivot shafts arranged in parallel two sides in the rack, two elongated finished product carrier frames respectively fastened to the pivot shafts and holding a number of rollers for receiving finished products from the corrugated metal sheet member making machine, and two air cylinders bilaterally mounted in the top side of the rack and respectively coupled to the pivot shafts through a respective link and controlled to bias the pivot shafts and to further move the elongated finished product carrier frames between the operative position for receiving finished products from the corrugated metal sheet member making machine and the non-operative position for enabling received finished products to fall to the bottom side of the rack for further collection.

3 Claims, 7 Drawing Sheets

FINISHED PRODUCT RECEIVING UNIT USED IN A CORRUGATED METAL SHEET MEMBER MAKING MACHINE

BACKGROUND AND SUMMARY OF THE INVENTION

The present invention relates to a corrugated metal sheet member making machine and more particularly, to a finished product receiving unit used in a corrugated metal sheet member making machine.

FIG. 1 shows a conventional corrugated metal sheet member making machine 10 for making corrugated metal sheets or metal tiles During operation of this structure of corrugated metal sheet member making machine 10, metal sheet material 100 is delivered from a material feeder 101 to a roller ramming unit 102 and roller-rammed into a corrugated form by the roller ramming unit 102, and then the corrugated metal sheet material is properly cut by a cutting unit 103 into corrugated metal sheet members subject to the desired size, and then the finished products are delivered one after another to a finished product receiving rack 105 by a conveyer 104. The finished product receiving rack 105 has a certain length. Workers are standing at two sides of the finished product receiving rack 105 to pick up and pack finished products. This manufacturing line requires much longitudinal installation space. Further, this design of corrugated metal sheet member making machine requires much labor and time to pick up and pack finished products.

The present invention has been accomplished under the circumstances in view. It is therefore the main object of the present invention to provide a finished product receiving unit for use in a corrugated sheet member making machine, which saves much labor and time in finished products collection.

To achieve this and other objects of the present invention, the finished product receiving unit is used in a corrugated metal sheet member making machine for receiving finished corrugated metal sheet members, comprising: an elongated rack extended in longitudinal direction; a plurality of pivot holders bilaterally symmetrically mounted in the rack; two pivot shafts respectively rotatably installed in the pivot holders and arranged in parallel to the length of the elongated rack; a plurality of angle bars symmetrically fastened to the pivot shafts at a bottom side; two elongated finished product carrier frames respectively fixedly mounted on the angle bars, the elongated finished product carrier frames each having an elongated flat body panel, a plurality of transverse slots cut through the elongated flat body panel and equally spaced along the length of the elongated flat body panel, and two side flanges respectively downwardly extended two opposite long sides of the elongated flat body panel; a plurality of rollers respectively pivotally coupled between the side flanges of each of the elongated finished product carrier frames corresponding to the transverse slots, the rollers each having the periphery thereof partially protruding over the respective transverse slot for receiving finished corrugated metal sheet members from the corrugated metal sheet member making machine; two links; a plurality of air cylinders bilaterally mounted in the elongated rack at a top side and respectively coupled to the pivot shafts through the links and adapted to turn the pivot shafts and to further move the elongated finished product carrier frames between an operative position and a non-operative position.

DETAILED DESCRIPTION OF THE INVENTION

Figure 1:
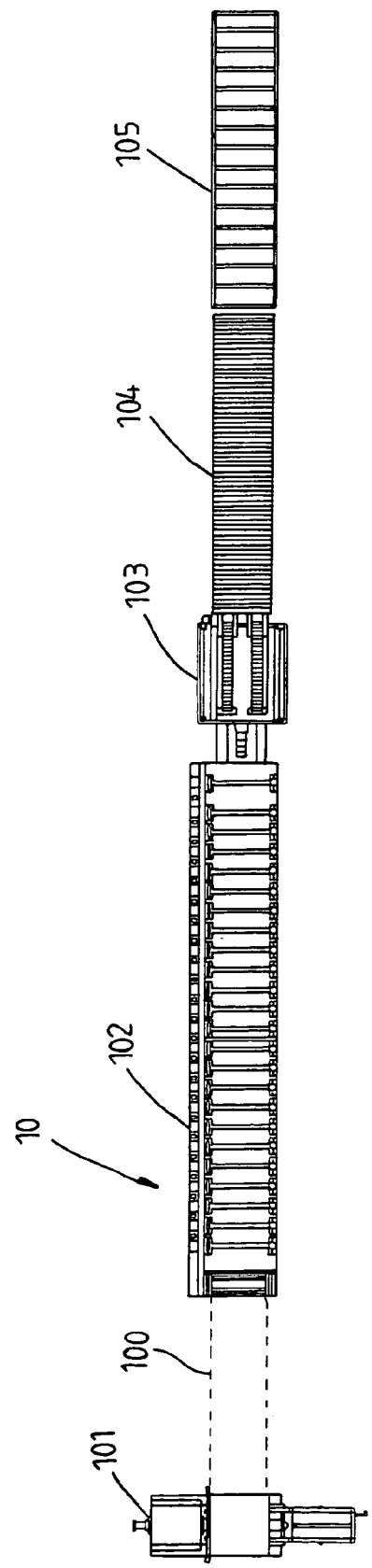
FIG. 1 is a top plain view of a corrugated metal sheet member making machine according to the prior art.
Figure 2:
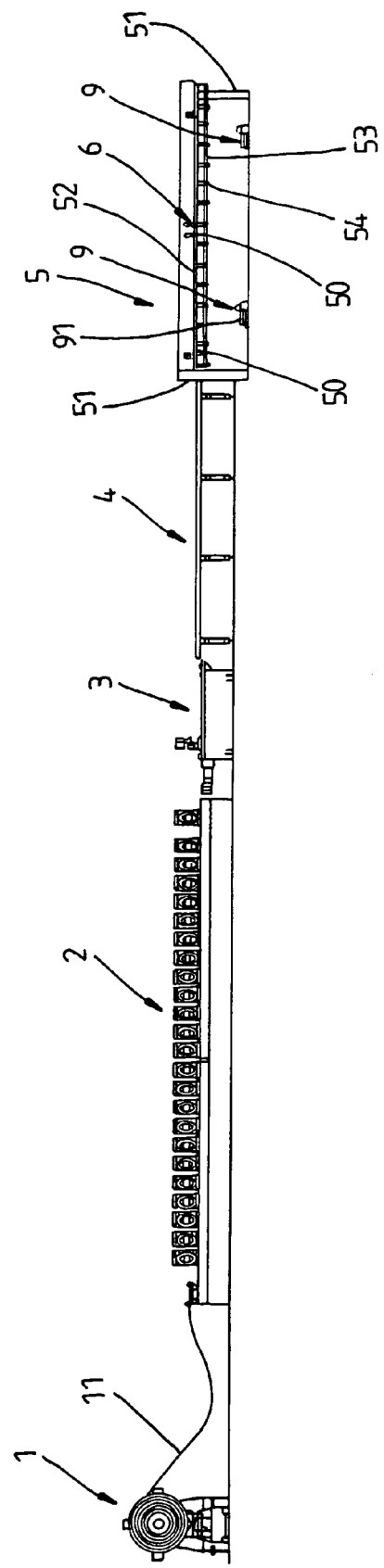
FIG. 2 is a side plain view of a corrugated metal sheet member making machine according to the present invention.
Figure 3:
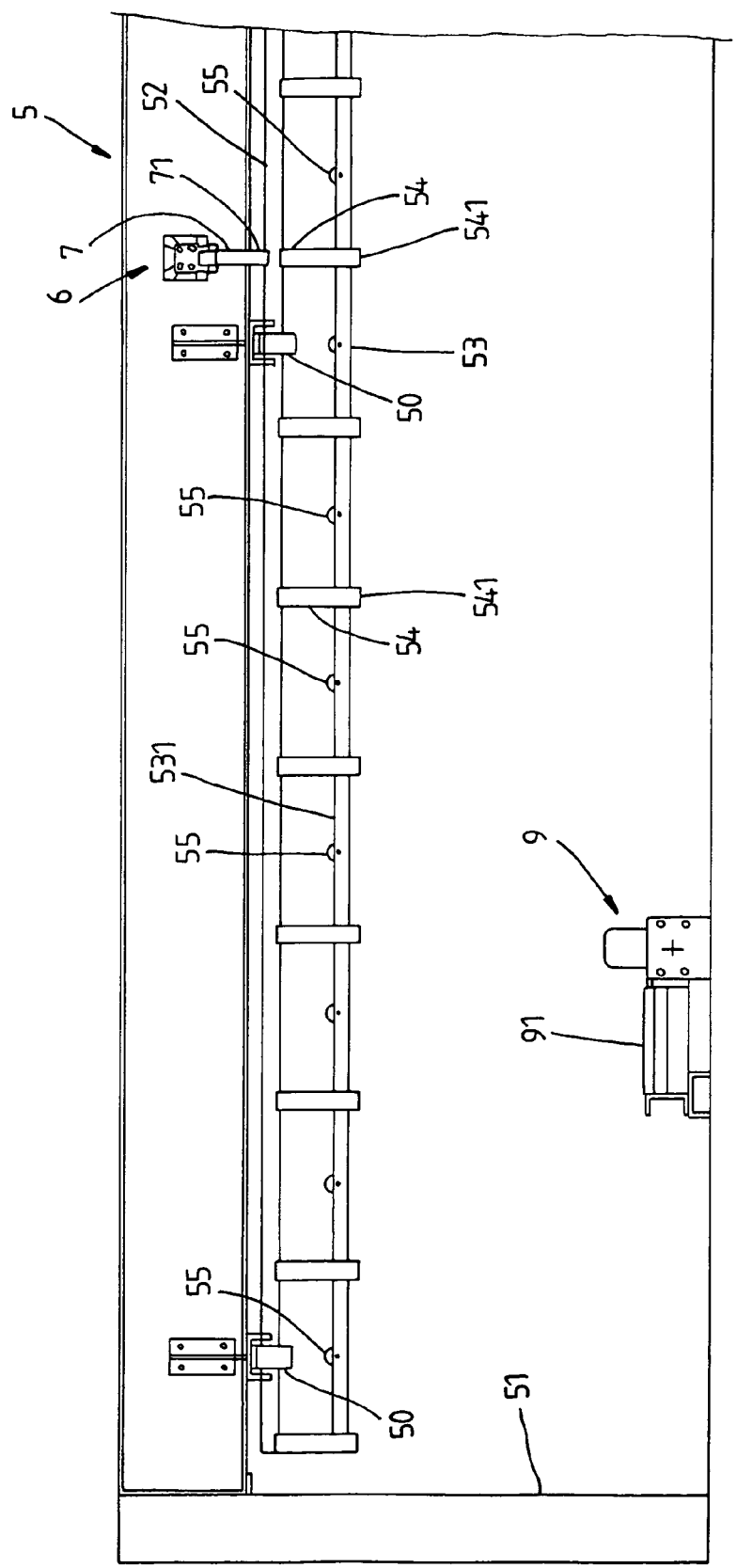
FIG. 3 is a side plain view in an enlarged scale of the finished product receiving unit used in the corrugated metal sheet member making machine according to the present invention.
Figure 4:
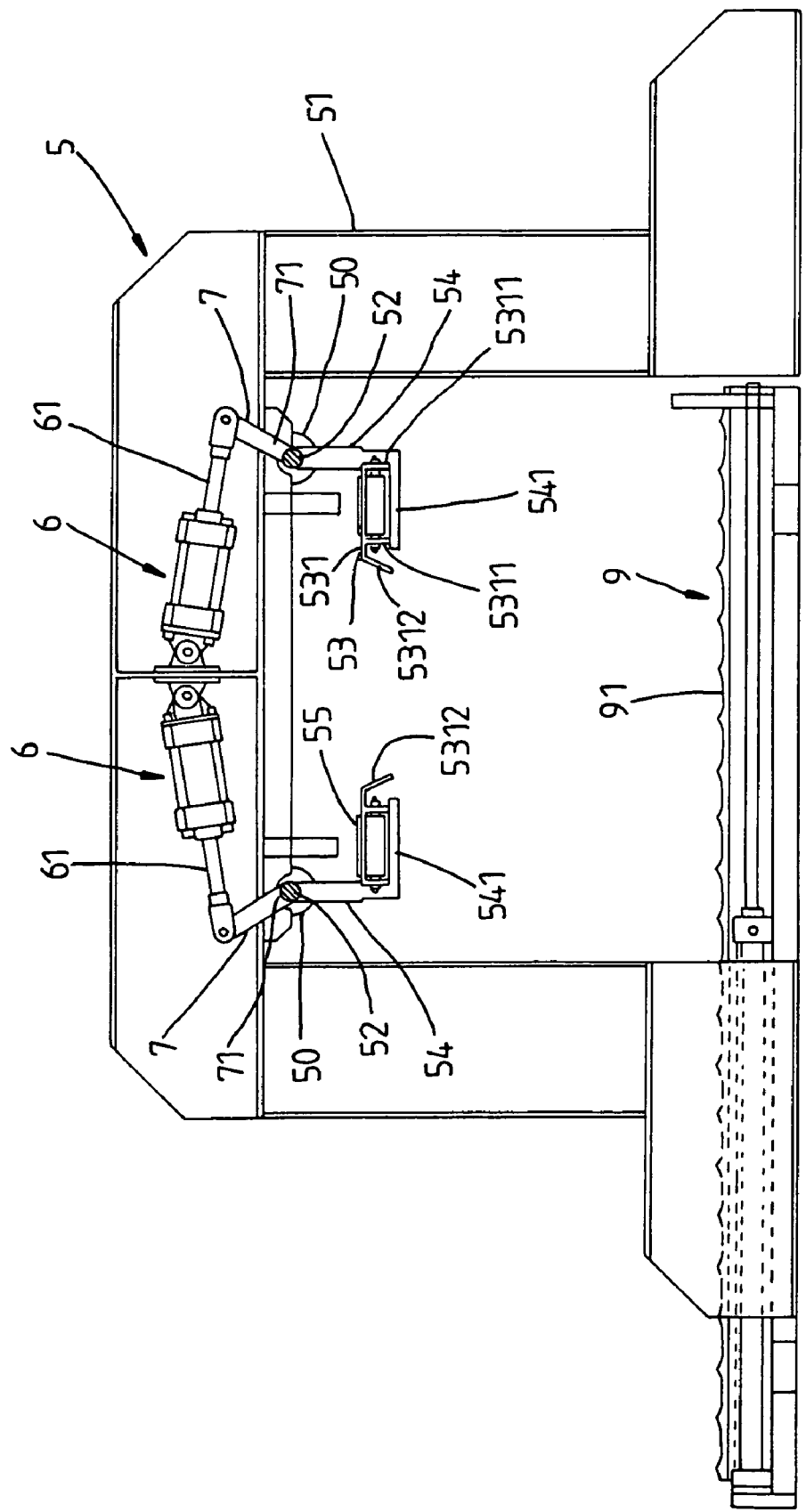
FIG. 4 is a front plain view in an enlarged scale of the finished product receiving unit according to the present invention.

Referring to FIGS. 2~7, a corrugated metal sheet member making machine in accordance with the present invention is shown comprised of a material feeder 1, a roller ramming unit 2, a cutting unit 3, a longitudinal conveyer 4, and a finished product receiving unit 5. Metal sheet material 11 is delivered from the material feeder 1 to the roller ramming unit 2 and roller-rammed into a corrugated form by the roller ramming unit 2, and then the corrugated metal sheet material is properly cut by the cutting unit 3 into corrugated metal sheet members subject to the desired size, and then the finished products are delivered one after another to the finished product receiving unit 5 by the longitudinal conveyer 4.

Figure 5:
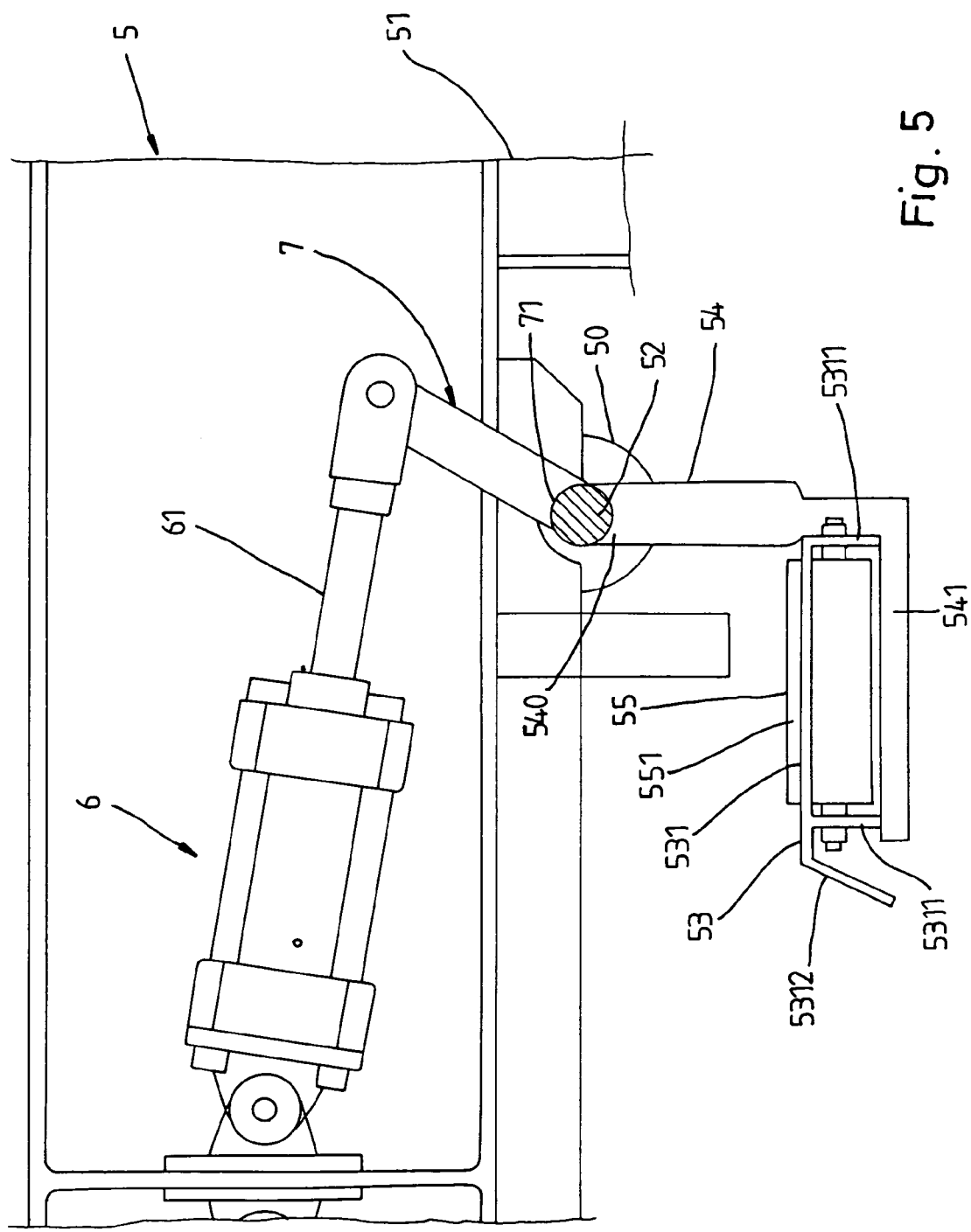
FIG. 5 is an enlarged view of a part of FIG. 4.
Figure 6:
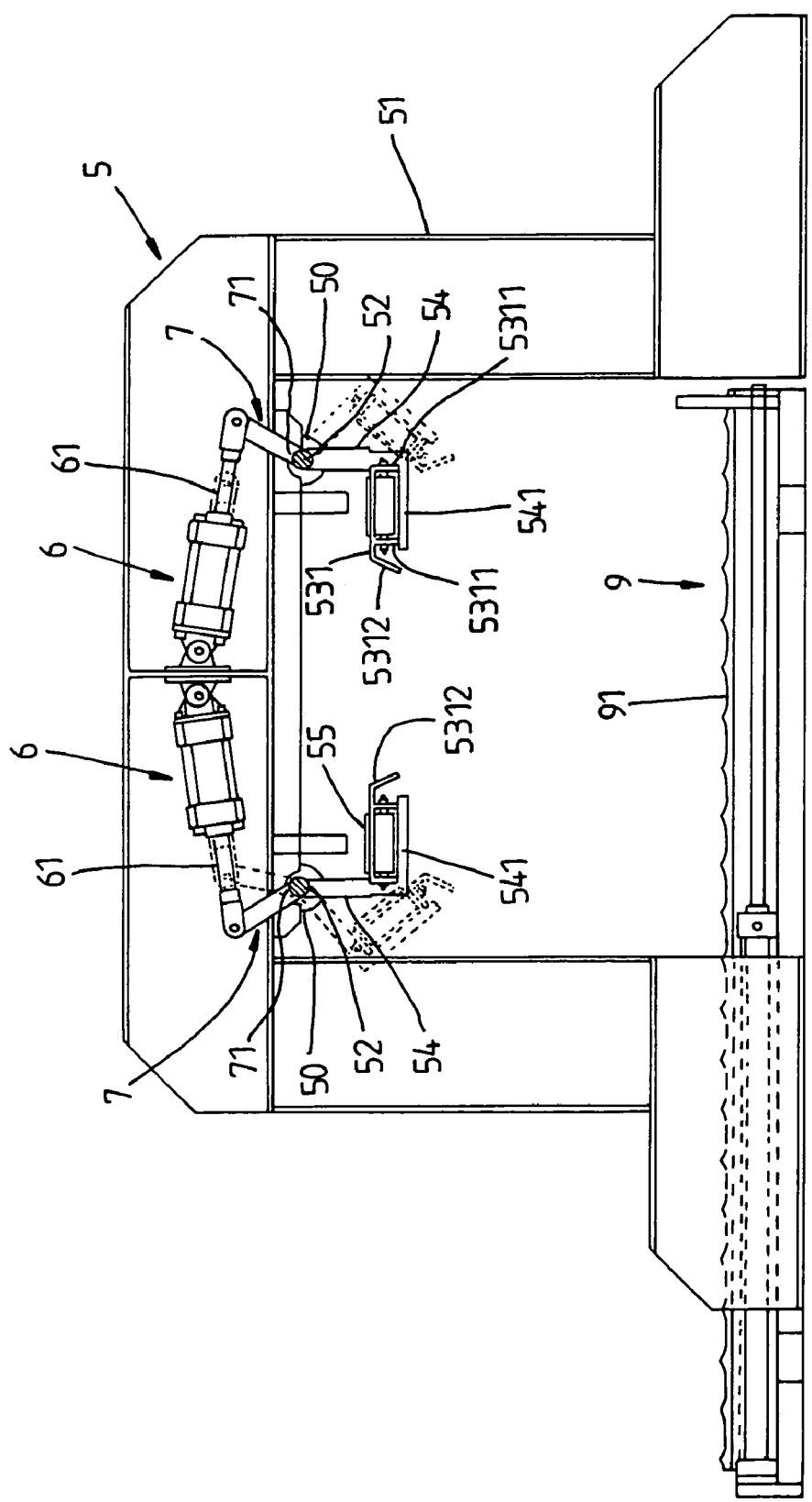
FIG. 6 corresponds to FIG. 4, showing the finished product receiving unit in action.
Figure 7:
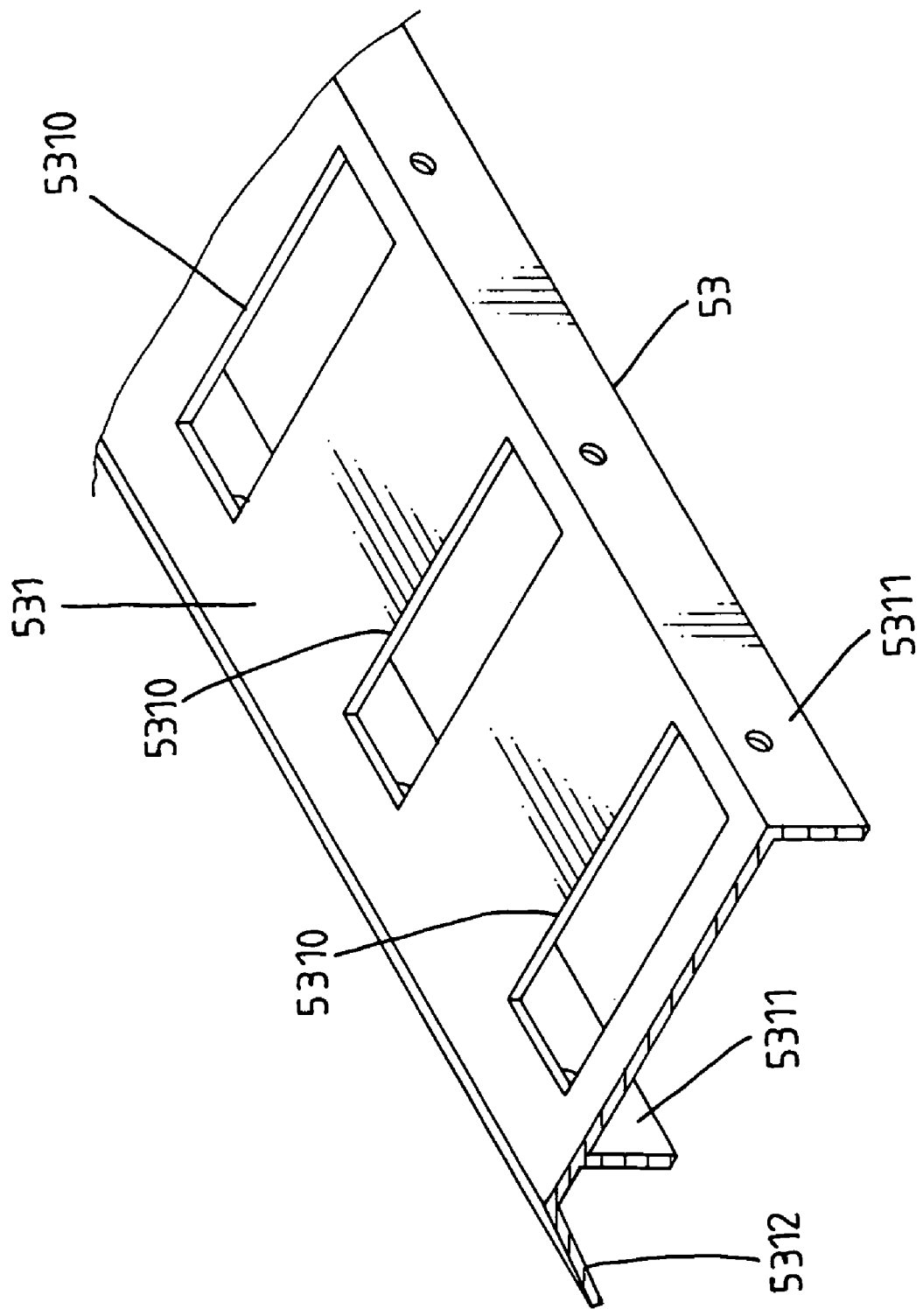
FIG. 7 is an enlarged view of the elongated finished product carrier frame according to the present invention.

Referring to FIGS. 5~7 again, the finished product receiving unit 5 comprises:

an elongated rack 51 extended in longitudinal direction;

a plurality of pivot holders 50 bilaterally symmetrically provided at the rack 51 near the top;

two pivot shafts 52 respectively rotatably installed in the pivot holders 50 and arranged in parallel to the length of the elongated rack 51;

a plurality of angle bars 54 symmetrically fastened to the pivot shafts 52, each angle bar 54 having a vertical section 540 fixedly connected to one pivot shaft 52 and a horizontal section 541;

two elongated finished product carrier frames 53 respectively fixedly mounted on the horizontal sections 541 of the angle bars 54, each elongated finished product carrier frame 53 having an elongated flat body panel 531, a plurality of transverse slots 5310 cut through the elongated flat body panel 531 and equally spaced along the length of the elongated flat body panel 531, two side flanges 5311 respectively downwardly extended the two opposite long sides of the elongated flat body panel 531, and a sloping guide flange 5312 obliquely downwardly extended from one long side of the elongated flat body panel 531;

a plurality of rollers 55 respectively pivotally coupled between the side flanges 5311 of each of the elongated finished product carrier frames 53 corresponding to the transverse slots 5310, each roller 55 having the periphery 551 partially protruding through the respective transverse slot 5310 over the top side of the elongated flat body panel 531 of the respective elongated finished product carrier frame 53;

a plurality of air cylinders 6 bilaterally mounted in the top side of the elongated rack 51, the air cylinders 6 each having a piston rod 61; and two links 7 each having a top end respectively coupled to the piston rods 61 of the air cylinders 6 and a bottom end 71 respectively coupled to the pivot shafts 52.

During operation of the corrugated metal sheet member making machine, finished products are delivered from the longitudinal conveyer 4 to the rollers 55 at the elongated finished product carrier frames 53. Further, the air cylinders 6 are controlled to move the respective piston rods 61 between the extended position wherein the pivot shafts 52 are biased by the links 7 to move the angle bars 54 and the elongated finished product carrier frames 53 to the operative position for receiving finished products from the longitudinal conveyer 4, and the received position where the pivot shafts 52 are biased by the links 7 to move the angle bars 54 and the elongated finished product carrier frames 53 to the non-operative position for enabling received finished products to fall from the elongated finished product carrier frames 53 for further collection.

As stated above, each elongated finished product carrier frame 53 has a sloping guide flange 5312 for guiding received finished products to fall from the respective elongated finished product carrier frame 53, preventing hooking of received finished products on the rollers 55.

Referring to FIGS. 2 and 4 again, a transverse conveyer 9 is provided at the bottom side of the elongated rack 51 of the finished product receiving unit 5, having a conveying table 91 for carrying finished products falling from the elongated rack 51 to the assigned place.

As indicated above, the design of the finished product receiving unit of the corrugated metal sheet member making machine greatly simplifies the collection and arrangement of finished products, thereby saving much labor and time.

While only one embodiment of the present invention has been shown and described, it will be understood that various modifications and changes could be made thereunto without departing from the spirit and scope of the invention disclosed.

What is claimed is:

1. A finished product receiving unit used in a corrugated metal sheet member making machine for receiving finished corrugated metal sheet members, comprising:

an elongated rack extended along in longitudinal direction;

a plurality of pivot holders bilaterally symmetrically mounted in said rack;

two pivot shafts respectively rotatably installed in said pivot holders and arranged in parallel to the length of said elongated rack;

a plurality of angle bars symmetrically fastened to said pivot shafts at a bottom side;

two elongated finished product carrier frames respectively fixedly mounted on said angle bars, said elongated finished product carrier frames each having an elongated flat body panel, a plurality of transverse slots cut through said elongated flat body panel and equally spaced along the length of said elongated flat body panel, and two side flanges respectively downwardly extended two opposite long sides of said elongated flat body panel;

a plurality of rollers respectively pivotally coupled between the side flanges of each of said elongated finished product carrier frames corresponding to said transverse slots, said rollers each having the periphery thereof partially protruding over the respective transverse slot for receiving finished corrugated metal sheet members from said corrugated metal sheet member making machine;

two links;

a plurality of air cylinders bilaterally mounted in said elongated rack at a top side and respectively coupled to said pivot shafts through said links and adapted to turn said pivot shafts and to further move said elongated finished product carrier frames between an operative position and a non-operative position.

2. The finished product receiving unit as claimed in claim 1, wherein each said elongated finished product carrier frame has a sloping guide flange obliquely downwardly extended from one long side of the elongated flat body panel thereof.

3. The finished product receiving unit as claimed in claim 1, further comprising a transverse conveyer provided below said elongated rack, said transverse conveyer comprising a conveying table for carrying finished products falling from said rollers to an assigned place.

* * * * *